(12) United States Patent
Uemura et al.

(10) Patent No.: US 11,904,265 B2
(45) Date of Patent: Feb. 20, 2024

(54) OIL SEPARATOR

(71) Applicant: DAIKIN INDUSTRIES, LTD., Osaka (JP)

(72) Inventors: Yoshiyuki Uemura, Osaka (JP); Tatsuya Katayama, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/945,655

(22) Filed: Sep. 15, 2022

(65) Prior Publication Data

US 2023/0017886 A1 Jan. 19, 2023

Related U.S. Application Data

(63) Continuation of application No. PCT/JP2021/005844, filed on Feb. 17, 2021.

(30) Foreign Application Priority Data

Mar. 31, 2020 (JP) .................................. 2020-063008

(51) Int. Cl.
  *B01D 46/00* (2022.01)
  *B01D 17/02* (2006.01)
  (Continued)

(52) U.S. Cl.
  CPC ......... *B01D 46/0002* (2013.01); *B01D 17/02* (2013.01); *B01D 45/16* (2013.01); *B01D 46/0039* (2013.01); *F04C 29/026* (2013.01)

(58) Field of Classification Search
  None
  See application file for complete search history.

(56) References Cited

U.S. PATENT DOCUMENTS

2002/0127121 A1* 9/2002 Matsuura ............ F04C 18/3446
  184/6.24
2009/0031753 A1* 2/2009 Yoo .......................... F25B 43/02
  62/470

(Continued)

FOREIGN PATENT DOCUMENTS

CN      109477483 A    3/2019
EP      3 608 543 A1   2/2020

(Continued)

OTHER PUBLICATIONS

International Preliminary Report of corresponding PCT Application No. PCT/JP2021/005844 dated Oct. 13, 2022.

(Continued)

*Primary Examiner* — Brit E. Anbacht
(74) *Attorney, Agent, or Firm* — Global IP Counselors, LLP

(57) ABSTRACT

An oil separator includes a cover attached to an opening portion on a discharge side of a compressor, a discharge flow path formed in an inside of the cover, and an oil separation portion configured to separate an oil from a fluid that has flowed out from the discharge flow path. A dividing wall portion partitions an internal space facing the opening portion into a plurality of spaces. The dividing wall portion is provided in the inside of the cover. The internal space is a discharge space into which a high-pressure gas refrigerant discharged from the compressor flows. Each of the plurality of spaces faces a high-pressure chamber in the opening portion so as to be in direct communication with the high-pressure chamber.

9 Claims, 8 Drawing Sheets

(51) Int. Cl.
    *B01D 45/16*     (2006.01)
    *F04C 29/02*     (2006.01)

(56)         References Cited

U.S. PATENT DOCUMENTS

2018/0328362  A1*  11/2018  Kim .................... F04C 29/026
2018/0328364  A1*  11/2018  Kim .................... B01D 50/20
2019/0360734  A1    11/2019  Kim et al.
2020/0230535  A1     7/2020  Inoue et al.
2023/0167820  A1*   6/2023  Kim ..................... F04C 29/12
                                                        418/55.1

FOREIGN PATENT DOCUMENTS

JP          5-141358  A     6/1993
JP          6597744   B2   10/2019
KR       10-0819015   B1    4/2008
WO       2019/064882  A1    4/2019

OTHER PUBLICATIONS

International Search Report of corresponding PCT Application No. PCT/JP2021/005844 dated Apr. 13, 2021.
European Search Report of corresponding EP Application No. 21 77 9966.7 dated Sep. 4, 2023.

* cited by examiner

|  | S1 | S2 | S3 | S4 | S5 | S6 | S7 | S8 |
|---|---|---|---|---|---|---|---|---|
| H[mm] | 108 | 148 | 106 | 93 | 156 | 113 | 157 | 121 |
| W[mm] | 50 | 50 | 50 | 80 | 80 | 80 | 100 | 100 |
| D[mm] | 50 | 50 | 50 | 50 | 50 | 50 | 50 | 50 | ns
OIL SEPARATOR

CROSS-REFERENCE TO RELATED APPLICATIONS

This is a continuation of International Application No. PCT/JP2021/005844 filed on Feb. 17, 2021, which claims priority to Japanese Patent Application No. 2020-063008, filed on Mar. 31, 2020. The entire disclosures of these applications are incorporated by reference herein.

BACKGROUND

Technical Field

The present disclosure relates to an oil separator.

Background Art

Japanese Patent No. 6597744 discloses an oil separator configured to be attached to a compressor. The oil separator has a cover to be attached to an opening portion of a casing of the compressor. An internal space in communication with a space on the discharge side of the compressor is formed in the inside of the cover (refer to FIG. 3 of Japanese Patent No. 6597744).

SUMMARY

A first aspect is an oil separator including a cover attached to an opening portion on a discharge side of a compressor, a discharge flow path formed in an inside of the cover, and an oil separation portion configured to separate an oil from a fluid that has flowed out from the discharge flow path. A dividing wall portion partitions an internal space facing the opening portion into a plurality of spaces. The dividing wall portion is provided in the inside of the cover. The internal space is a discharge space into which a high-pressure gas refrigerant discharged from the compressor flows. Each of the plurality of spaces faces a high-pressure chamber in the opening portion so as to be in direct communication with the high-pressure chamber.

BRIEF DESCRIPTION OF THE DRAWINGS

FIG. 2 illustrates a state in which a cover is viewed from the front side.

DETAILED DESCRIPTION OF EMBODIMENT(S)

Hereinafter, embodiments of the present invention will be described with reference to the drawings. The following embodiments are basically presented as preferred examples and do not intend to limit the present invention, applications thereof, or the range of use thereof. Components in the embodiments, the modification, the other examples, and the like described below can be combined together or partially replaced within a range in which the present invention is executable.

Embodiment

A compressor unit (U) according to an embodiment has a compressor (10) and an oil separator (30). The oil separator (30) is attached to the compressor (10). The compressor unit (U) is to be connected to a refrigerant circuit of a refrigeration apparatus. The refrigerant circuit is charged with a refrigerant. The refrigerant corresponds to the fluid in the present disclosure. The refrigerant circuit is configured to perform a vapor compression refrigeration cycle. Specifically, the refrigerant compressed in the compressor dissipates heat in a radiator. The refrigerant that has dissipated heat is decompressed in a decompression portion. The refrigerant decompressed in the decompression portion evaporates in an evaporator. The refrigerant that has evaporated in the evaporator is sucked by the compressor. The refrigerant includes a lubricating oil (hereafter, referred to as the oil) for lubricating sliding portions of the compressor (10).

Compressor

Figure 1:
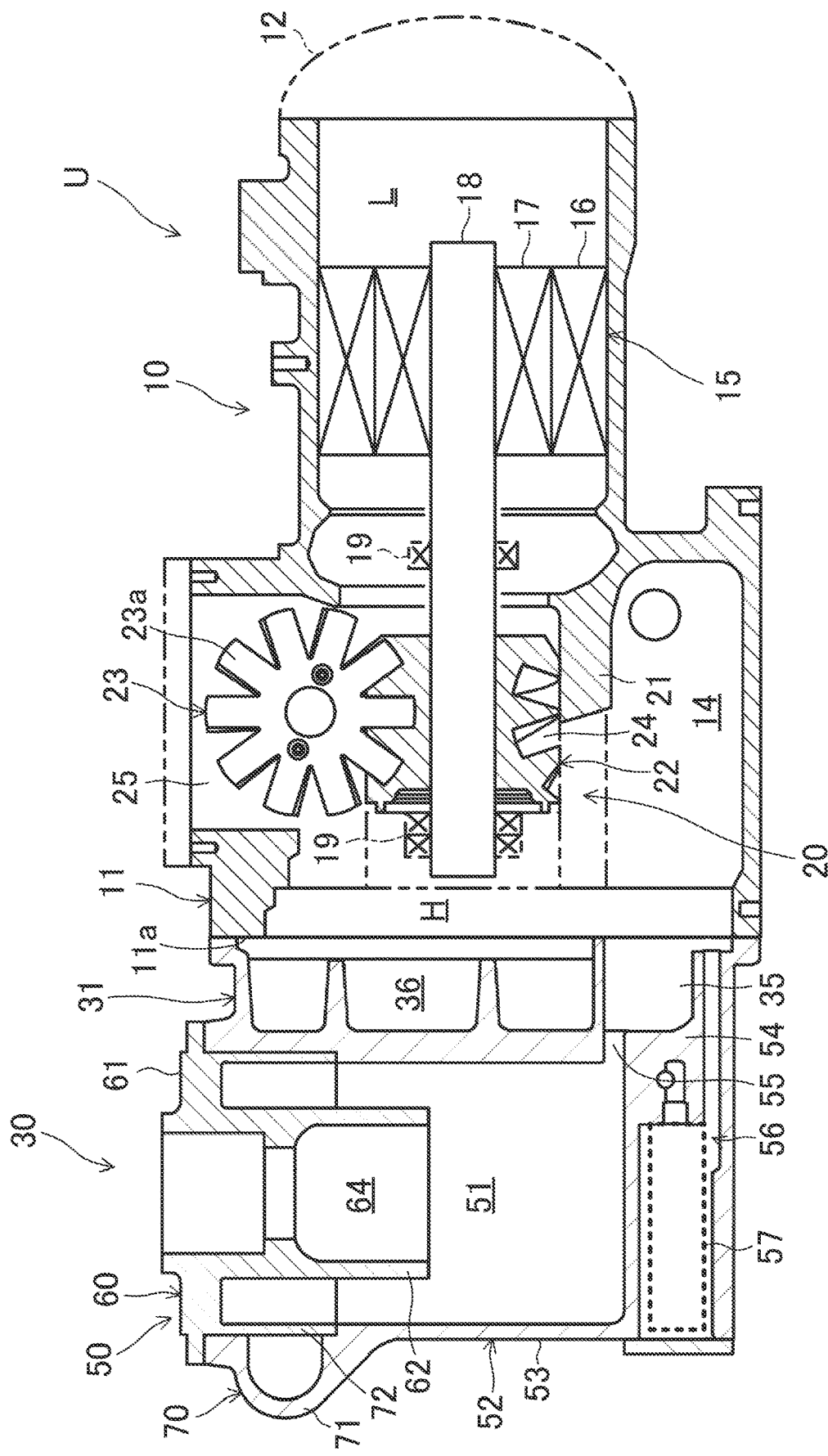
FIG. 1 is a longitudinal sectional view illustrating a schematic configuration of a compressor unit according to an embodiment.

The compressor (10) compresses a refrigerant. The compressor (10) sucks a gas refrigerant having a low pressure and compresses the gas refrigerant. The compressor (10) discharges the gas refrigerant having a high pressure after compression. As illustrated in FIG. 1, the compressor (10) is a screw compressor. The compressor (10) is of a single screw type having one screw rotor (22). The compressor (10) is of a one gate type having one gate rotor (23). The compressor (10) includes a casing (11), an electric motor (15), a drive shaft (18), and a compression mechanism (20).

Casing

The casing (11) has a laterally elongated cylindrical shape. A low-pressure chamber (L) and a high-pressure chamber (H) are formed in the inside of the casing (11). The low-pressure chamber (L) constitutes a flow path in which the low-pressure gas refrigerant that is to be sucked by the compression mechanism (20) flows. The high-pressure chamber (H) constitutes a flow path in which the high-pressure gas refrigerant discharged from the compression mechanism (20) flows.

A suction cover (12) is attached to one end of the casing (11) in the longitudinal direction. An opening portion (11*a*) is formed at the other end of the casing (11) in the longitudinal direction. The opening portion (11*a*) is provided on the high-pressure side of the casing (11) where the high-pressure chamber (H) is formed. The cover (31) of the oil separator (30) is attached to the opening portion (11*a*). An oil chamber (14) in which the oil is stored is formed at a bottom portion in the casing (11).

Electric Motor

The electric motor (15) is housed in the casing (11). The electric motor (15) has a stator (16) and a rotor (17). The stator (16) is fixed to the inner wall of the casing (11). The rotor (17) is disposed in the inside of the stator (16). The drive shaft (18) is fixed in the inside of the rotor (17).

Drive Shaft

The drive shaft (18) couples the electric motor (15) and the compression mechanism (20) to each other. The drive shaft (18) extends in the longitudinal direction of the casing (11). The drive shaft (18) extends in a substantially horizontal direction. The drive shaft (18) is rotatably supported by a plurality of bearings (19). The bearings (19) are fixed to the casing (11) via a bearing folder (not illustrated).

Compression Mechanism

The compression mechanism (20) has one cylinder portion (21), one screw rotor (22), and one gate rotor (23).

The cylinder portion (21) is formed in the inside of the casing (11). The screw rotor (22) is disposed on the inner side of the cylinder portion (21). The screw rotor (22) is fixed to the drive shaft (18). A plurality (three in the present example) of spiral screw grooves (24) are formed in the outer peripheral surface of the screw rotor (22). The outer peripheral surface of the tooth tip of the screw rotor (22) is surrounded by the cylinder portion (21). One end side of the screw rotor (22) in the axial direction faces the low-pressure chamber (L). The other end side of the screw rotor (22) in the axial direction faces the high-pressure chamber (H).

The gate rotor (23) is housed in the gate rotor chamber (25). The gate rotor (23) has a plurality of radially arranged gates (23a). The gates (23a) of the gate rotor (23) pass through a portion of the cylinder portion (21) and mesh with the screw grooves (24). A suction port and a compression chamber are formed in the compression mechanism (20). The suction port is a part of the screw grooves (24) opening in the low-pressure chamber (L). The compression chamber is formed among the inner peripheral surface of the cylinder portion (21), the screw grooves (24), and the gates (23a). In the compression mechanism (20), the refrigerant compressed in the compression chamber is discharged to the high-pressure chamber (H) through a discharge port.

The compression mechanism (20) has a slide valve mechanism (not illustrated). The slide valve mechanism adjusts a timing at which the compression chamber and the discharge port are caused to be in communication with each other. The slide valve mechanism includes a slide member (slide valve) that moves forward and rearward in the axial direction of the drive shaft (18). A portion of the slide member is positioned in the high-pressure chamber (H).

Oil Separator

Figure 2:
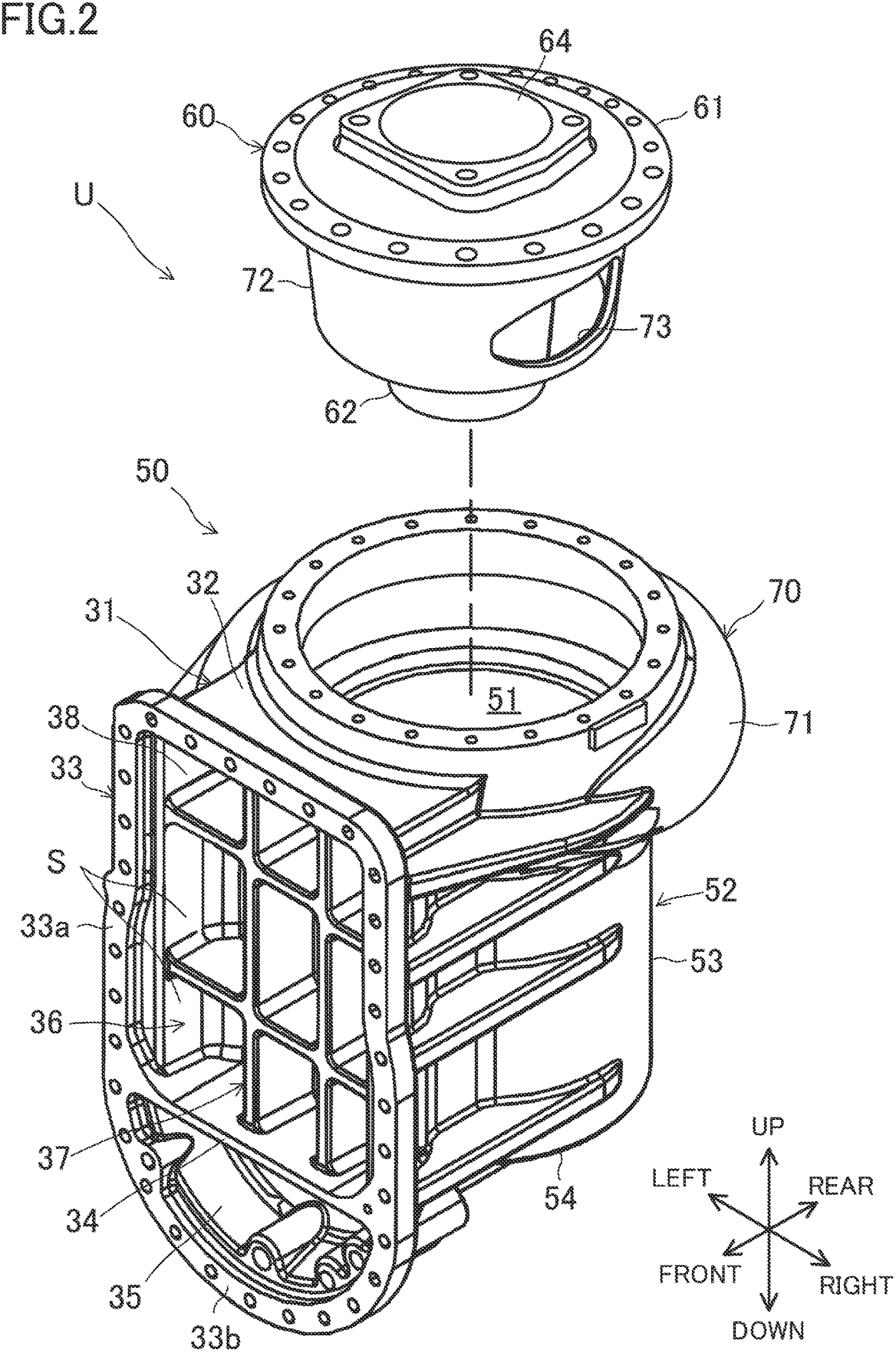
FIG. 2 is an exploded perspective view of an oil separator.

The oil separator (30) will be described. In the following description, terms relating to "up", "down", "right", "left", "front", and "rear" are basically based on a case in which the cover (31) illustrated in FIG. 2 is viewed from the front.

The oil separator (30) is of a centrifugal separation type that separates an oil from a refrigerant by a centrifugal force. The oil separator (30) separates the oil from the refrigerant discharged from the compression mechanism (20). The oil separator (30) includes the cover (31), a cylindrical oil separator body (50), and a bent pipe (70).

Cover

The cover (31) will be described with reference to FIG. 1 to FIG. 6.

The cover (31) is attached to the opening portion (11a) on the discharge side of the compressor (10). The cover (31) blocks the high-pressure chamber (H) of the compressor (10). The vertical height of the cover (31) in the vertical direction is larger than the width thereof in the left-right direction. The cover (31) has a cover body (32) and a flange portion (33). The cover body (32) has a hollow shape that opens on the front side. The flange portion (33) is provided at the front end of the cover body (32). The flange portion (33) has a vertically elongated frame shape. The flange portion (33) is fixed to the opening portion (11a) of the casing (11) via a fastening member.

The flange portion (33) includes a first flange portion (33a) and a second flange portion (33b). The first flange portion (33a) is formed to extend from an upper portion to an intermediate portion of the flange portion (33). The second flange portion (33b) is formed at a lower portion of the flange portion (33). The first flange portion (33a) has an inverted U-shape in front view. Strictly, the first flange portion (33a) has a shape in which a lower side of a vertically elongated rectangular portion is cut out in front view. The second flange portion (33b) has a U-shape in front view. Strictly, the second flange portion (33b) has an arc shape in front view.

The cover (31) has a partition wall (34). The partition wall (34) is provided at a lower portion of the flange portion (33). The partition wall (34) is positioned at the boundary part between the first flange portion (33a) and the second flange portion (33b). The partition wall (34) extends in the horizontal direction so as to extend between left and right both ends of the flange portion (33). The partition wall (34) partitions the inside of the cover (31) into an oil reservoir space (35) and a discharge space (36).

The oil reservoir space (35) is positioned below the partition wall (34). The oil reservoir space (35) is positioned on the inner side of the second flange portion (33b). As illustrated in FIG. 1, the oil reservoir space (35) is at a height position corresponding to the oil chamber (14) in the casing (11). In the oil reservoir space (35), the oil that has been separated in the oil separator (30) accumulates.

The discharge space (36) is positioned above the partition wall (34). The discharge space (36) is positioned on the inner side of the first flange portion (33a). The discharge space (36) is at a height position corresponding to the high-pressure chamber (H) in the casing (11). The high-pressure gas refrigerant discharged by the compression mechanism (20) flows into the discharge space (36). The discharge space (36) corresponds to the internal space in the present disclosure.

Figure 3:
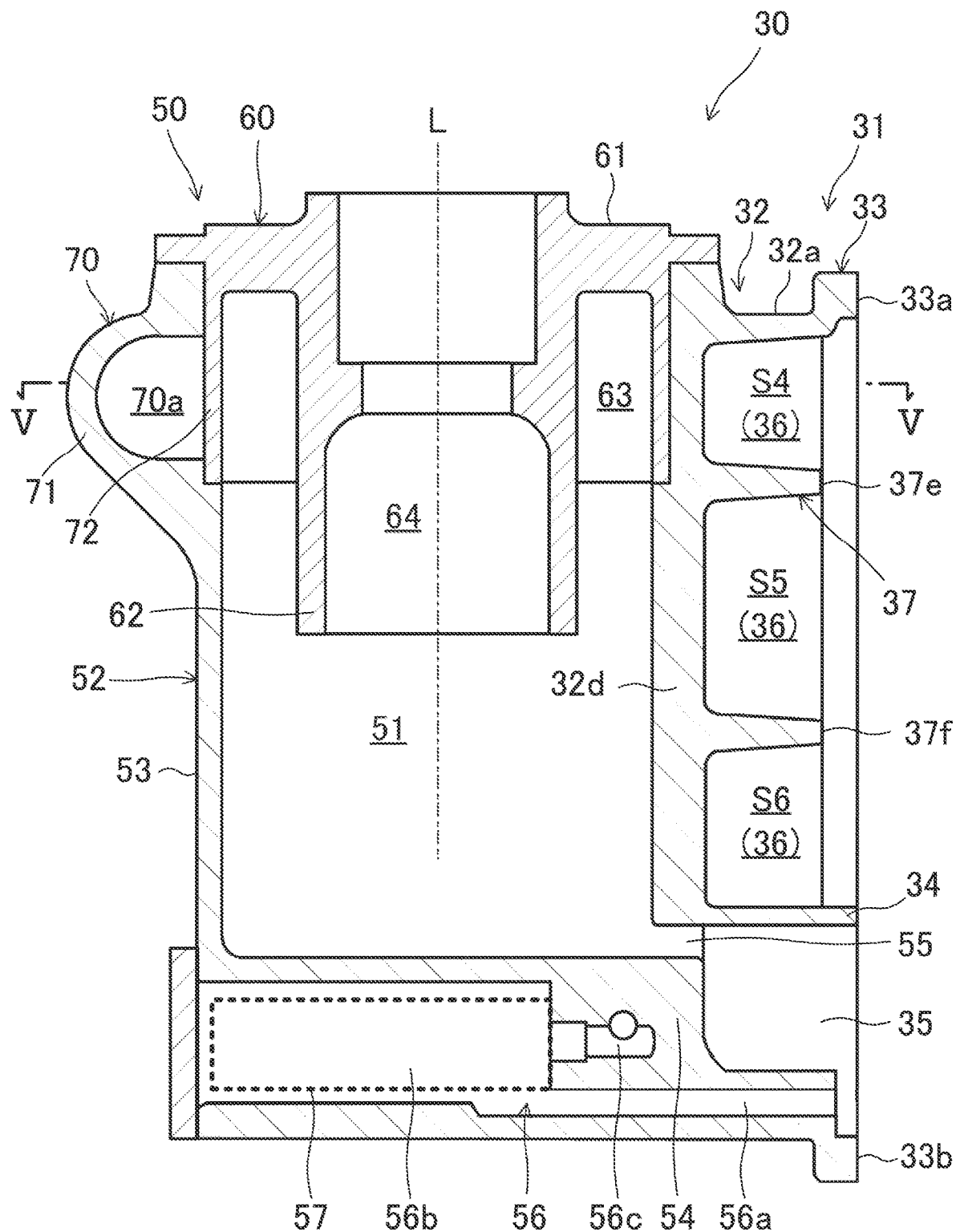
FIG. 3 is a cross-section taken along line in FIG. 4.
Figure 4:
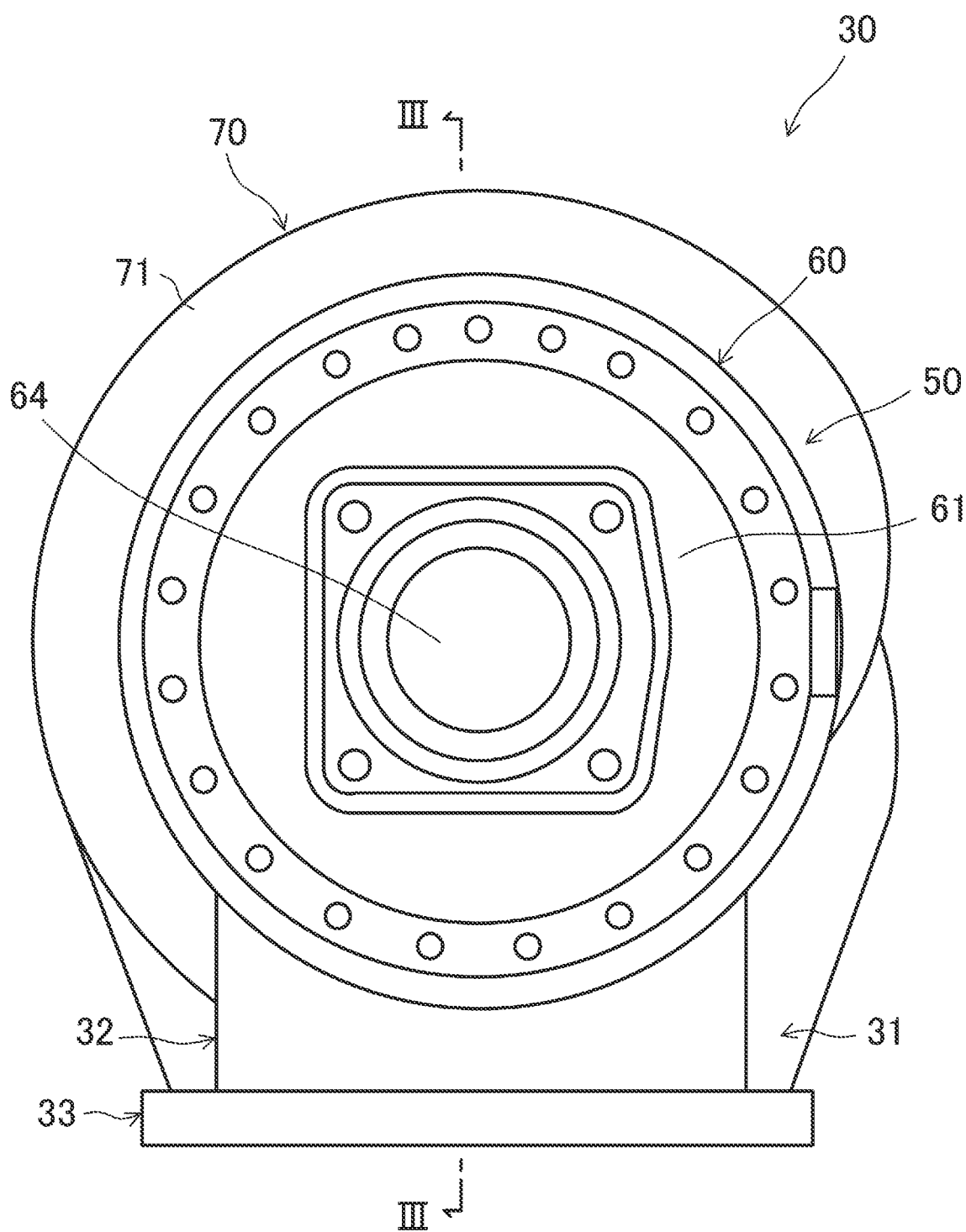
FIG. 4 is a top view of an oil separator according to an embodiment.
Figure 6:
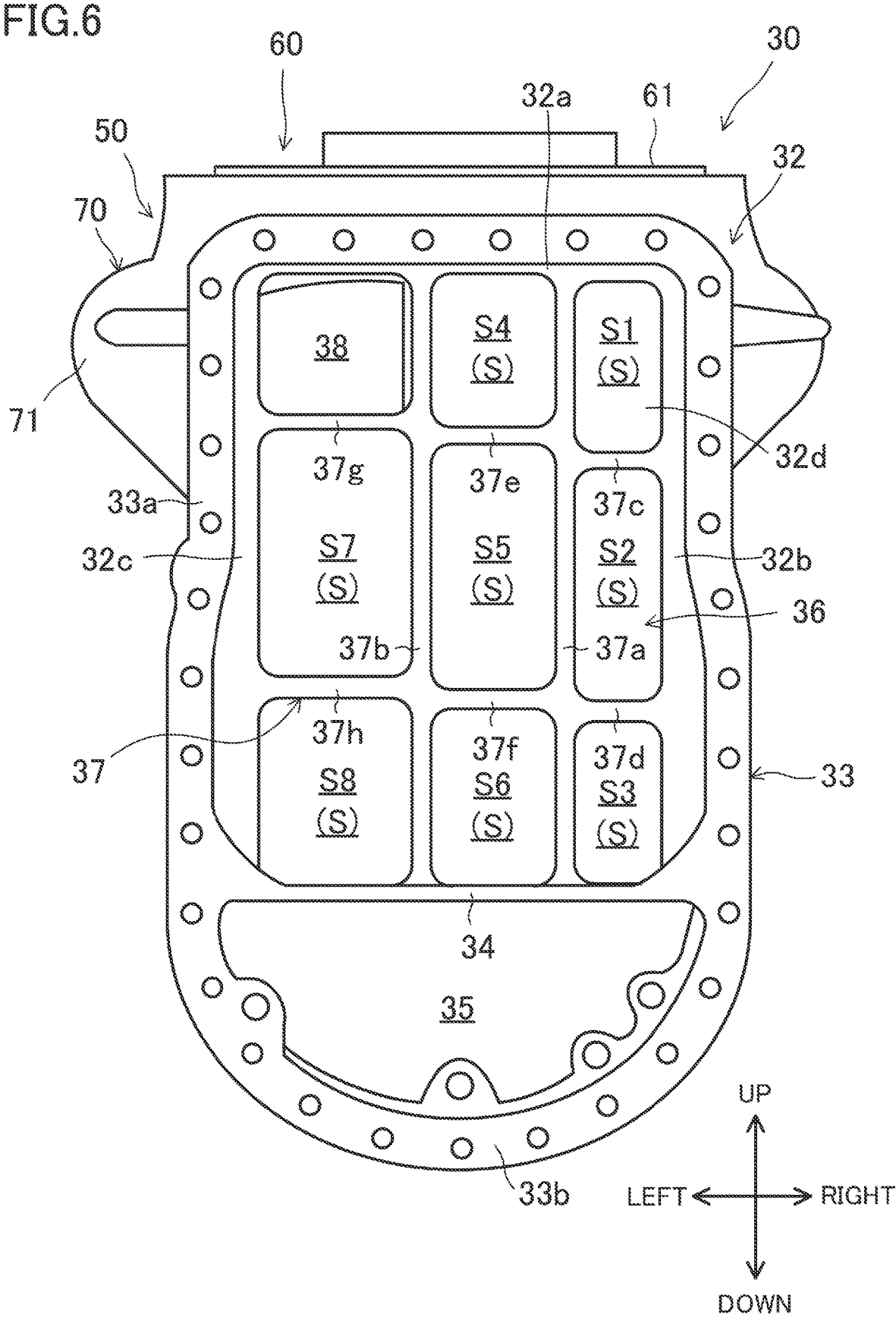
FIG. 6 is a front view of the cover.

As illustrated in FIG. 2, FIG. 3, and FIG. 6, the discharge space (36) is partitioned into a plurality of spaces by a dividing wall portion (37). A total of nine spaces in three rows and three columns are formed in the cover (31) in the present embodiment. Among these spaces, the space on the uppermost side and on the leftmost side constitutes the discharge flow path (38). The discharge flow path (38) is in communication with the bent pipe (70). The remaining eight spaces correspond to divided spaces (S). The divided spaces (S) correspond to the spaces in the present disclosure. Details of the dividing wall portion (37) and the divided spaces (S) will be described later.

Outline of Oil Separator Body

The oil separator body (50) will be described with reference to FIG. 2 to FIG. 5.

The oil separator body (50) has a cylindrical shape. Strictly, the oil separator body (50) has a hollow cylindrical shape. A separation space (51) for separating the oil from the refrigerant by a centrifugal force is formed in the inside of the oil separator body (50). The refrigerant that has flowed through the bent pipe (70) flows into the separation space (51). The oil separator body (50) has an outer cylinder (52) and a cover member (60). The oil separator body (50) corresponds to the oil separation portion in the present disclosure.

Outer Cylinder

As illustrated in FIG. 2 and FIG. 3, the outer cylinder (52) has a bottomed cylindrical shape that is open on the upper side. The outer cylinder (52) includes a cylindrical body portion (53) and a bottom portion (54) formed on the lower side of the body portion (53). Strictly, the outer cylinder (52) has an outer wall portion (71) of the bent pipe (70).

The front part of the body portion (53) is integral with the cover (31). The body portion (53) has an oil outflow hole (55). The oil outflow hole (55) is formed at the lower end of the front part of the body portion (53). The oil outflow hole (55) is at a height position identical to the height position of the bottom surface of the outer cylinder (52). The oil outflow hole (55) causes the separation space (51) and the oil reservoir space (35) to be in communication with each other. The oil in the separation space (51) flows out to the oil reservoir space (35) through the oil outflow hole (55).

An oil-returning flow path (56) is formed at the bottom portion (54). The oil-returning flow path (56) is a flow path for supplying the oil in the oil reservoir space (35) to a predetermined lubrication portion and the like of the compressor (10). The oil-returning flow path (56) includes a first flow path (56a), a second flow path (56b), and a third flow path (56c). In the oil-returning flow path (56), the first flow path (56a), the second flow path (56b), and the third flow path (56c) are connected in this order from the upstream side toward the downstream side.

The inflow end of the first flow path (56a) opens in the oil reservoir space (35). The outflow end of the first flow path (56a) opens in the second flow path (56b). The outer diameter of the second flow path (56b) is larger than the outer diameters of the first flow path (56a) and the third flow path (56c). The second flow path (56b) is provided with a catching member (57) that catches impurities in the oil. The catching member (57) is constituted by, for example, a bottomed cylindrical mesh member. The front open end of the catching member (57) surrounds the inflow port of the third flow path (56c). The oil from which impurities are caught by the catching member (57) is supplied to a predetermined sliding portion via the third flow path (56c).

Cover Member

As illustrated in FIG. 2 to FIG. 5, the cover member (60) is attached to the upper open portion of the outer cylinder (52). The cover member (60) has an upper cover (61) and an inner cylinder (62). The cover member (60) in the present embodiment further has an inner wall portion (72) of the bent pipe (70). The inner wall portion (72) constitutes a portion of the bent pipe (70).

The upper cover (61) has a substantially disc shape. The upper cover (61) is fixed to the upper end of the outer cylinder (52) via a fastening member. A seal member (not illustrated) is provided between the lower surface of the outer edge of the upper cover (61) and the upper end surface of the outer cylinder (52).

The inner cylinder (62) has a cylindrical shape that opens upward and downward. The inner cylinder (62) is provided at a central portion of the upper cover (61). The inner cylinder (62) projects downward from the upper cover (61). The inner cylinder (62) is at a height position corresponding to an upper portion of the outer cylinder (52). In other words, the inner cylinder (62) is at a height position corresponding to substantially half of the upper side of the outer cylinder (52). A cylinder space (63) is formed between the outer cylinder (52) and the inner cylinder (62). The cylinder space (63) constitutes a portion of the separation space (51). In the cylinder space (63), in particular, a swirling flow of the refrigerant is easily formed.

An outflow passage (64) that causes the separation space (51) and a discharge pipe (not illustrated) to be in communication with each other is formed in the inside of the inner cylinder (62). The discharge pipe is connected to the refrigerant circuit.

The axes of the upper cover (61), the inner cylinder (62), and the outer cylinder (52) substantially coincide with each other. In FIG. 3, these axes are indicated by a one dot chain line L.

Bent Pipe

Figure 5:
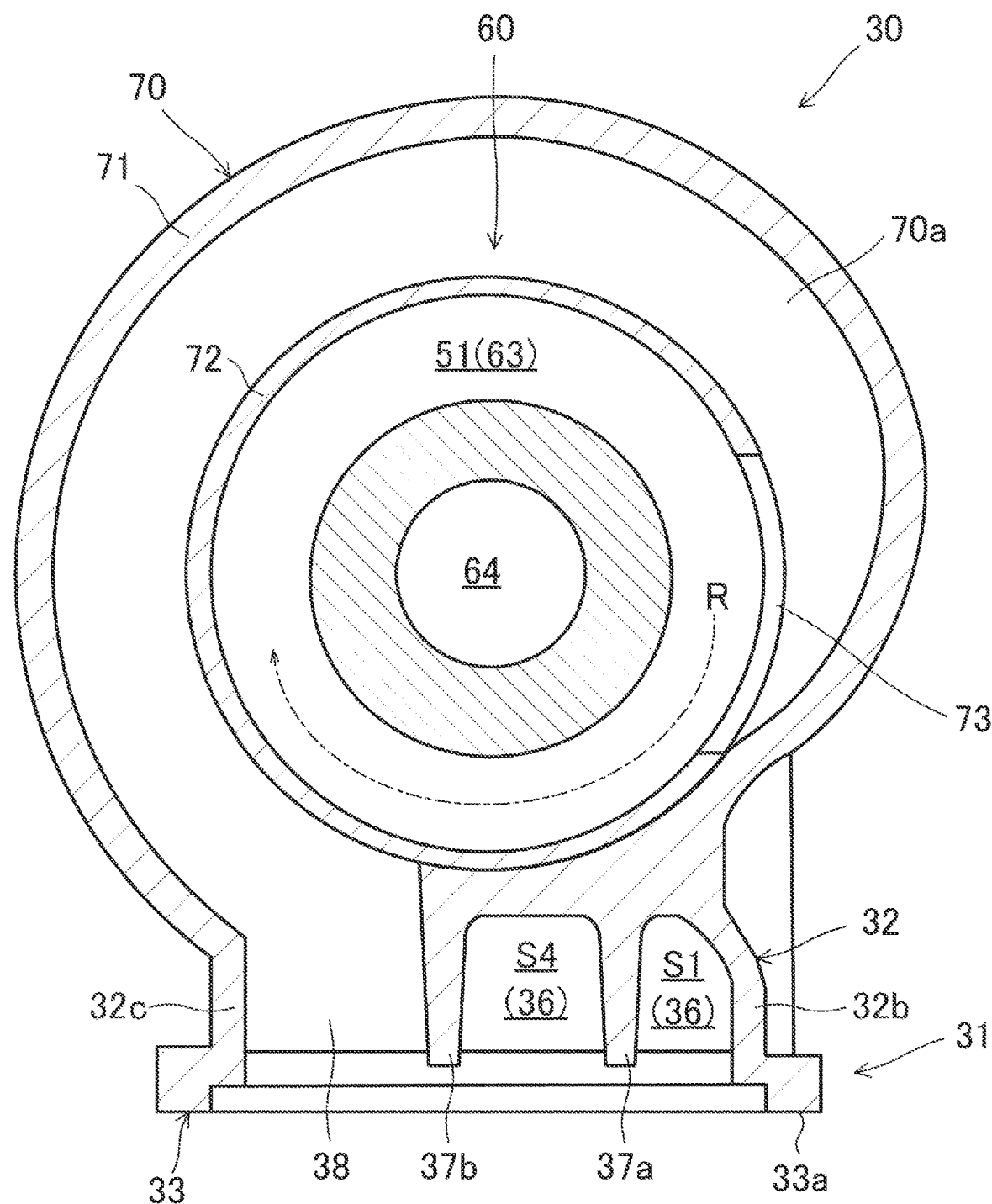
FIG. 5 is a cross-section taken along line V-V in FIG. 3.

The bent pipe (70) will be described with reference to FIG. 2 to FIG. 5. The bent pipe (70) introduces the high-pressure refrigerant containing the oil into the oil separator body (50). The bent pipe (70) is disposed to surround the body portion (53) of the oil separator body (50) in the circumferential direction. The height position of the bent pipe (70) is the same throughout the entirety thereof. In other words, the bent pipe (70) in the present embodiment is not inclined in the vertical direction. The bent pipe (70) curves in a direction along the swirling flow. In FIG. 5, the direction of the swirling flow is indicated by the arrow R of a one dot chain line. The bent pipe (70) is at a height position corresponding to the cylinder space (63). In the inside of the bent pipe (70), an internal flow path (70a) that curves along the bent pipe (70) is formed.

As illustrated in FIG. 3 and FIG. 5, the bent pipe (70) includes the outer wall portion (71) and the inner wall portion (72).

The outer wall portion (71) extends in the circumferential direction of the body portion (53). The outer wall portion (71) expands from the body portion (53) outwardly in the radial direction of the body portion (53). The inner surface of the outer wall portion (71) facing the internal flow path (70a) has a substantially U-shape that is open on the front side when viewed in an A section. Here, the A section is a section perpendicular to the pipe axis direction of the bent pipe (70). In other words, the A section is a section perpendicular to the paper surface direction of FIG. 2.

The outer wall portion (71) and the body portion (53) are integral with each other. The outer wall portion (71) is integral with an upper portion of the body portion (53). In a state in which the cover member (60) is not attached to the outer cylinder (52), the inner surface of the outer wall portion (71) faces the inside of the outer cylinder (52).

The inner wall portion (72) extends along the outer wall portion (71). The inner wall portion (72) closes an open part on the radially inner side of the outer wall portion (71). The inner surface of the inner wall portion (72) facing the internal flow path (70a) has a planar shape extending vertically in the A sectional view.

In the present embodiment, the outer wall portion (71) and the inner wall portion (72) are constituted by different members. The inner wall portion (72) and the upper cover (61) are integral with each other. In more detail, the inner wall portion (72), the upper cover (61), and the inner cylinder (62) are integral with each other. The inner wall portion (72) extends downward from a part close to the outer edge of the upper cover (61).

As illustrated in FIG. 5, the inflow end of the bent pipe (70) is in communication with the discharge flow path (38) of the flange portion (33). The inner wall portion (72) has an outflow port (73). The outflow port (73) is at a position corresponding to the outflow end of the bent pipe (70). The outflow port (73) corresponds to the hole in the present disclosure.

Molding of Oil Separator

The oil separator (30) is constituted by, mainly, a first member and a second member. The first member includes the cover (31), the body portion (53), the bottom portion (54), and the outer wall portion (71). The first member is constituted by a cast product molded with a cast. The second member includes the upper cover (61), the inner cylinder (62), and the inner wall portion (72). The second member is constituted by a cast product molded with a cast.

Operational Action of Compressor

The operational action of the compressor (10) will be described with reference to FIG. 1.

When the electric motor (15) drives the drive shaft (18), the screw rotor (22) rotates. In response to the rotation of the screw rotor (22), the gate rotor (23) rotates. As a result, a suction process, a compression process, and a discharge process are sequentially and repeatedly performed in the compression mechanism (20).

(1) Suction Process

In the compression mechanism (20), the volumes of the screw grooves (24) in communication with the low-pressure chamber (L) are increased. In response to this, the low-pressure gas in the low-pressure chamber (L) is sucked into the screw grooves (24) through the suction port.

(2) Compression Process

When the screw rotor (22) further rotates, the gate rotor (23) divides the screw grooves (24), thereby forming a compression chamber in the screw grooves (24). As a result of the volume of the compression chamber decreasing in response to the rotation of the gate rotor (23), the refrigerant in the compression chamber is compressed.

(3) Discharge Process

When the screw rotor (22) further rotates, the compression chamber is caused to be in communication with the discharge port. The refrigerant in the compression chamber is discharged to the high-pressure chamber (H) through the discharge port.

As a result of the above-described three processes being performed successively and repeatedly, the refrigerant is discharged periodically from the compression mechanism (20) to the high-pressure chamber (H).

Operation of Oil Separator

Operation of the oil separator will be described with reference to FIG. 3 and FIG. 5.

The refrigerant discharged into the high-pressure chamber (H) is sent to a high-pressure space (S) in the flange portion (33) and flows into the bent pipe (70) through the discharge flow path (38). The bent pipe (70) curves to surround the body portion (53) in the circumferential direction. Therefore, a centrifugal force acts on the oil contained in the refrigerant that flows in the internal flow path (70a). As a result, the oil is separated from the refrigerant. The oil that has been separated from the refrigerant moves onto the inner surface of the outer wall portion (71). The separated fine oil particles aggregate on the inner surface of the outer wall portion (71).

The bent pipe (70) is positioned on the radially outer side of the outer cylinder (52). Therefore, the centrifugal force that acts on the oil in the internal flow path (70a) of the bent pipe (70) is larger than that in the separation space (51). Consequently, the bent pipe (70) can accelerate the oil separation effect.

The refrigerant and the oil that have flowed out from the bent pipe (70) flow into the separation space (51) in the outer cylinder (52) through the outflow port (73). The oil particles that have aggregated in the bent pipe (70) accumulate at the bottom of the separation space (51). The fine oil particles that remain in the refrigerant are separated from the refrigerant by the centrifugal force in the separation space (51).

The refrigerant from which the oil has been separated as described above flows out to the discharge pipe via the outflow passage (64) of the inner cylinder (62). The refrigerant that has flowed out from the discharge pipe flows in the refrigerant circuit and is utilized for a refrigeration cycle.

Details of Cover

Details of the cover (31) will be described with reference to FIG. 6. The cover body (32) has an upper wall (32a), a first side wall (32b), a second side wall (32c), and a third side wall (32d). The first side wall (32b) constitutes the right wall of the cover body (32). The second side wall (32c) constitutes the left wall of the cover body (32). The third side wall (32d) constitutes the rear wall of the cover body (32). The first side wall (32b), the second side wall (32c), and the third side wall (32d) extend in the vertical direction. The upper wall (32a) constitutes the upper wall of the cover body (32). The upper wall (32a) extends in the horizontal direction.

The discharge space (36) is formed among the first side wall (32b), the second side wall (32c), the third side wall (32d), the upper wall (32a), and the partition wall (34). The discharge space (36) extends in the vertical direction. The vertical direction corresponds to the first direction in the present disclosure.

The discharge space (36) is divided into a plurality of divided spaces (S) by the dividing wall portion (37). The dividing wall portion (37) includes a first vertical wall (37a), a second vertical wall (37b), a first lateral wall (37c), a second lateral wall (37d), a third lateral wall (37e), a fourth lateral wall (37f), a fifth lateral wall (37g), and a sixth lateral wall (37h).

The first vertical wall (37a) and the second vertical wall (37b) extend in the vertical direction. The first vertical wall (37a) and the second vertical wall (37b) partition the discharge space (36) in the left-right direction. The left-right direction corresponds to the second direction in the present disclosure orthogonal to the first direction. The first vertical wall (37a) is closer to the first side wall (32b) than to the second side wall (32c). The second vertical wall (37b) is closer to the second side wall (32c) than to the first side wall (32b). The first vertical wall (37a) and the second vertical wall (37b) correspond to the first wall in the present disclosure.

The first lateral wall (37c), the second lateral wall (37d), the third lateral wall (37e), the fourth lateral wall (37f), the fifth lateral wall (37g), and the sixth lateral wall (37h) extend in the horizontal direction. The first lateral wall (37c), the second lateral wall (37d), the third lateral wall (37e), the fourth lateral wall (37f), the fifth lateral wall (37g), and the sixth lateral wall (37h) partition the discharge space (36) in the vertical direction.

Specifically, the first lateral wall (37c) and the second lateral wall (37d) are provided between the first side wall (32b) and the first vertical wall (37a). The first lateral wall (37c) is positioned above the second lateral wall (37d). The third lateral wall (37e) and the fourth lateral wall (370 are provided between the first vertical wall (37a) and the second vertical wall (37b). The third lateral wall (37e) is positioned above the fourth lateral wall (370. The fifth lateral wall (37g) and the sixth lateral wall (37h) are provided between the second vertical wall (37b) and the second side wall (32c). The fifth lateral wall (37g) is positioned above the sixth lateral wall (37h).

A first divided space (S1) is formed among the first side wall (32b), the first vertical wall (37a), the upper wall (32a), and the first lateral wall (37c). A second divided space (S2) is formed among the first side wall (32b), the first vertical wall (37a), the first lateral wall (37c), and the second lateral wall (37d). A third divided space (S3) is formed among the first side wall (32b), the first vertical wall (37a), the second lateral wall (37d), and the partition wall (34).

A fourth divided space (S4) is formed among the first vertical wall (37a), the second vertical wall (37b), the upper wall (32a), and the third lateral wall (37e). A fifth divided space (S5) is formed among the first vertical wall (37a), the second vertical wall (37b), the third lateral wall (37e), and the fourth lateral wall (37f). A sixth divided space (S6) is formed among the first vertical wall (37a), the second vertical wall (37b), the fourth lateral wall (370, and the partition wall (34).

The above-described discharge flow path (38) is formed among the second vertical wall (37b), the second side wall (32c), the upper wall (32a), and the fifth lateral wall (37g). A seventh divided space (S7) is formed among the second vertical wall (37b), the second side wall (32c), the fifth lateral wall (37g), and the sixth lateral wall (37h). An eighth divided space (S8) is formed among the second vertical wall (37b), the second side wall (32c), the sixth lateral wall (37h), and the partition wall (34).

The seventh divided space (S7) overlaps the above-described slide member in the forward-rearward direction of the slide member. The direction of the slide member corresponds to the front-rear direction of the cover (31). Thus, when the slide member moves rearward, the rear portion of the slide member is positioned in the inside of the seventh divided space (S7). Therefore, the slide member and the cover (31) do not interfere with each other. As described above, the discharge space (36) functions as a space for suppressing components of the compressor (10) and the cover (31) from interfering with each other. A notch for suppressing interference with the rear end of the slide member may be formed in the inner wall of the seventh divided space (S).

The first to eighth divided spaces (S1 to S8) may be described as the divided spaces (S) for convenience. These divided spaces (S) each have a substantially rectangular parallelepiped shape.

Example of Dimensions of Divided Space

Figures 7, 8:
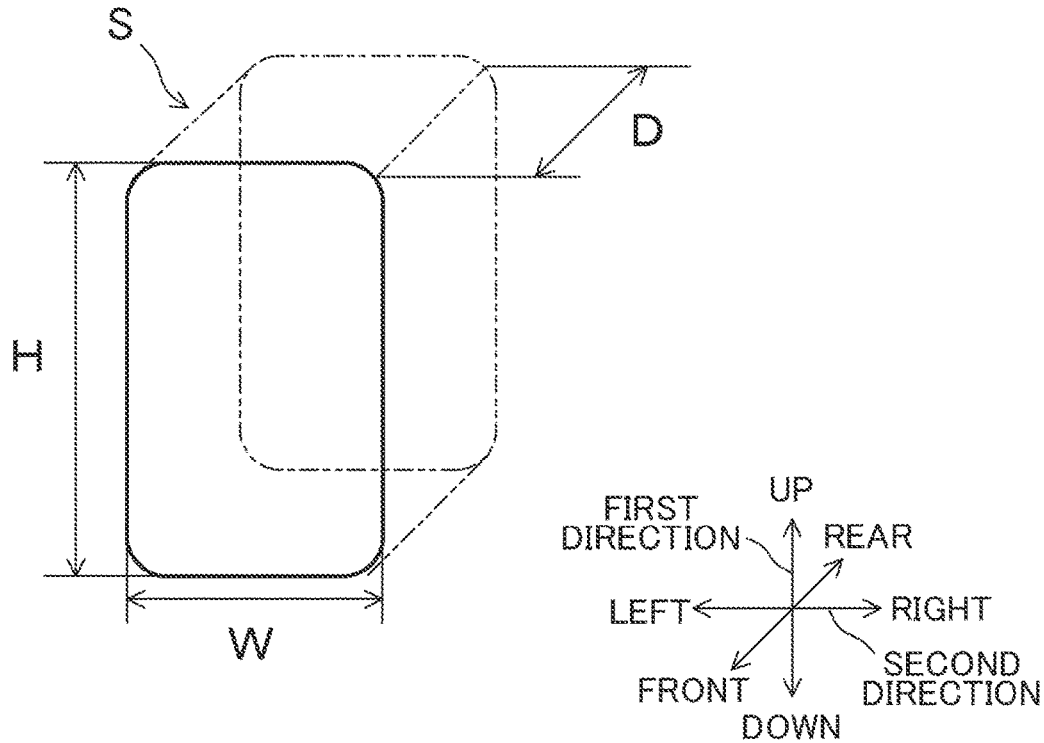
FIG. 7 is a schematic view in which dimensions of a space are prescribed.
FIG. 8 is a table indicating examples of dimensions of a plurality of divided spaces.

A dimensional relationship among the divided spaces (S) will be described with reference to FIG. 6 to FIG. 8.

In the present embodiment, the shapes of all of the plurality (eight) of the divided spaces (S) differ from each other. Specifically, in each divided space (S), a height H, a width W, and a depth length D illustrated in FIG. 7 are set as indicated in FIG. 8. The height H denotes the length of the divided space (S) in the vertical direction. The width W denotes the length of the divided space (S) in the left-right direction. The depth length D denotes the depth length of the divided space (S) in the front-rear direction.

In the present embodiment, the heights H of all of the divided spaces (S) differ from each other.

In the present embodiment, the widths W of the vertically arranged three divided spaces (S) are equal to each other. In detail, the widths W of the first to third divided spaces (S1 to S3) are equal to each other. The widths W of the fourth to sixth divided spaces (S4 to S6) are equal to each other. The widths W of the seventh and eighth divided spaces (S8) are equal to each other.

The width W of each of the first to third divided spaces (S1 to S3), the width W of each of the fourth to sixth divided spaces (S4 to S6), and the width W of each of the seventh and eighth divided spaces (S8) differ from each other. In other words, the widths W of at least three divided spaces (S) differ from each other. In detail, the widths of the divided spaces (S) partitioned in the second direction differ from each other.

In the present embodiment, the depth lengths D of all of the divided spaces (S) are equal to each other.

Effects of Embodiment

If the discharge space (36) is one space, the acoustic resonance frequency of the discharge space (36) easily decreases due to the discharge pulsation of the compression mechanism (20). Consequently, the oil separator (30) and the compressor (10) are vibrated, and the vibration and the noise of the compressor unit (U) increase. In contrast, in the present embodiment, it is possible, by partitioning the discharge space (36) into the plurality of divided spaces (S), to increase the acoustic resonance frequency in each of the divided spaces (S). Consequently, it is possible to suppress the oil separator (30) from being vibrated due to the discharge pulsation and possible to suppress an increase in the vibration and the noise of the compressor unit (U).

The cover (31) in which the discharge space (36) extends in the vertical direction is easily vibrated in the width direction due to discharge pulsation. Meanwhile, in the present embodiment, the discharge space (36) is partitioned in the left-right direction by the vertical walls (37a and 37b) extending in the vertical direction. Consequently, the widths of the divided spaces (S) can be reduced, and it is thus possible to increase the acoustic resonance frequency in the width direction in the divided spaces (S). As a result, it is possible to suppress the oil separator (30) from being vibrated in the width direction.

Since the vertical wall (37a and 37b) extend linearly in the vertical direction, processing is also easy. In addition, it is possible to increase the rigidity of the cover (31) in the longitudinal direction by the vertical walls (37a and 37b). Moreover, by forming the lateral walls (37c, 37d, 37e, and 370, it is possible to increase the rigidity of the cover (31) in the left-right direction.

If the shapes of the plurality of divided spaces (S) are completely identical to each other, the resonance mode of these divided spaces (S) is excited, and the vibration force of the oil separator (30) increases. In contrast, in the present embodiment, the shapes of the plurality of divided spaces (S) differ from each other, and it is thus possible to suppress excitation of the resonance mode of these divided spaces (S). As a result, it is possible to suppress the vibration force of the oil separator (30) from increasing due to excitation of the resonance mode. In particular, the shapes of all of the divided spaces (S) differ from each other in the present embodiment. It is thus possible to sufficiently suppress excitation of the resonance mode.

The plurality of divided spaces (S) have the widths W that differ from each other. Therefore, it is possible to suppress excitation of the resonance mode that is in the width direction and that particularly easily causes shaking of the oil separator (30).

The heights H of the plurality of divided spaces (S) differ from each other. It is thus possible to suppress excitation of the resonance mode in the height direction.

The depth lengths D of the plurality of divided spaces (S) are equal to each other. It is thus possible to form the inner surface of the third side wall (32d) to be flat and to simplify the structure of the cover (31). The third side wall (32d) has the largest area among the walls that form the cover (31). Due to the third side wall (32d) being flat, it is possible to effectively simplify the cast for molding the cover (31).

When the depth lengths D of the plurality of divided spaces (S) are set to be equal to each other, it is possible to easily adjust the resonance point of each divided space (S) on the basis of two parameters of the width W and the height H of the divided space (S). Consequently, it is possible to suppress excitation of the resonance mode of the divided spaces (S).

The depth length of the entirety of the discharge space (36) is shorter than the height of the entirety of the discharge space (36) and the width of the entirety of the discharge space (36). Therefore, even when the depth lengths D of the plurality of divided spaces (S) are set to different lengths, the effect that can suppress the vibration force of the oil separator (30) is low. Conversely, the height and the width of the entirety of the discharge space (36) are longer than the depth length of the entirety of the discharge space (36). Therefore, by setting the heights H of the plurality of divided spaces (S) to different lengths, it is possible to effectively suppress the vibration force of the oil separator (30). By setting the widths W of the plurality of divided spaces (S) to different lengths, it is possible to effectively suppress the vibration force of the oil separator (30).

Modification of Embodiment

Figure 9:
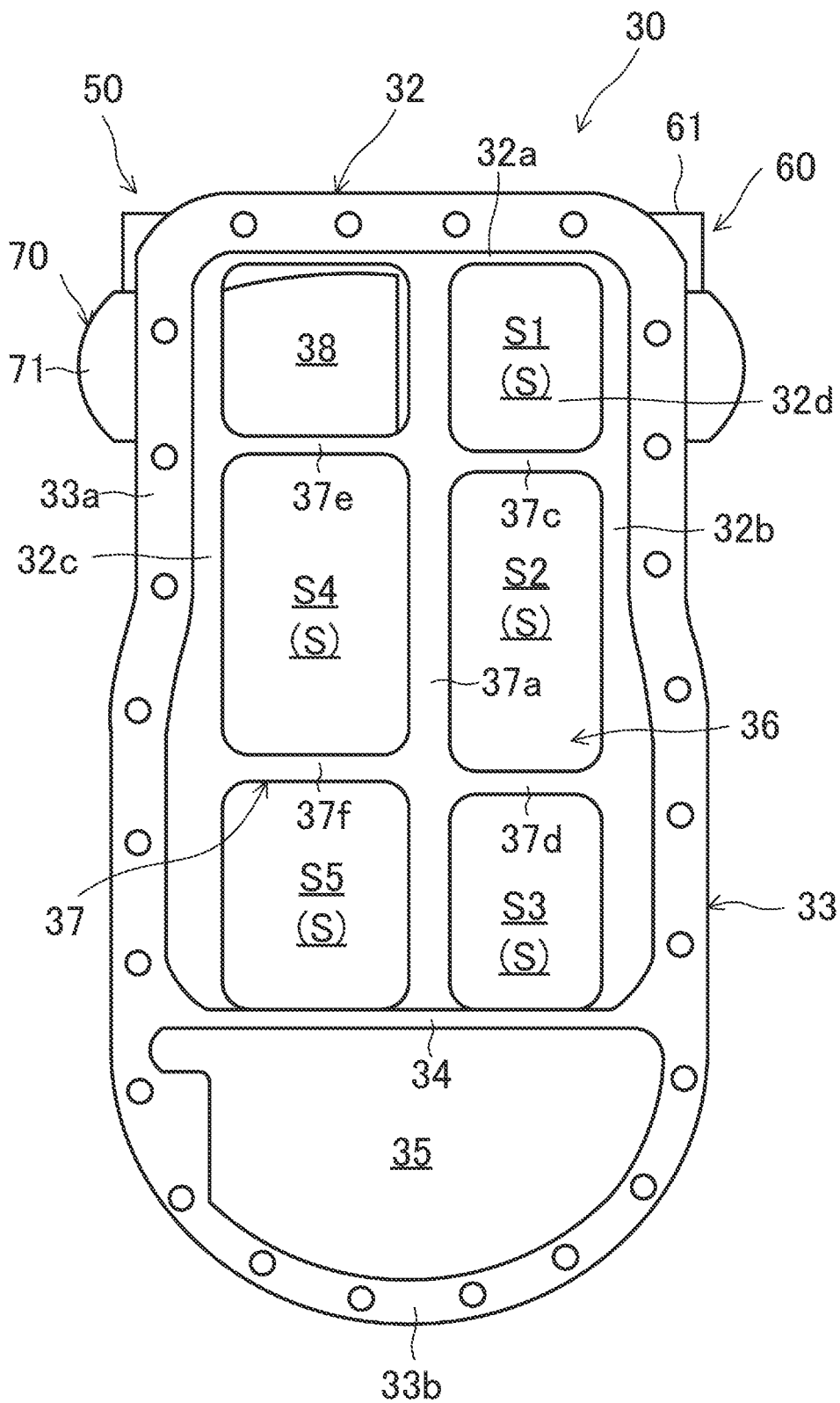
FIG. 9 is a view according to a modification and corresponding to FIG. 6.

The modification illustrated in FIG. 9 differs from the above-described embodiment in terms of the configuration of the cover (31). The cover (31) in the present example is applied to the compressor (10) that is smaller than that in the above-described embodiment.

The dividing wall portion (37) of the cover (31) has the first vertical wall (37a), the first lateral wall (37c), the second lateral wall (37d), the third lateral wall (37e), and the fourth lateral wall (37f). The first vertical wall (37a) is provided at an intermediate portion of the discharge space (36) in the left-right direction. The first vertical wall (37a) extends in the vertical direction and partitions the discharge space (36) in the left-right direction.

The first divided space (S1), the second divided space (S2), and the third divided space (S3) are formed in this order from the top toward the bottom between the first side wall (32b) and the first vertical wall (37a). The discharge flow path (38), the fourth divided space (S4), and the fifth divided space (S5) are formed in this order from the top toward the bottom between the first vertical wall (37a) and the second side wall (32c).

Also in the modification, the shapes of all of the divided spaces (S) differ from each other. Specifically, the heights H of all of the divided spaces (S) differ from each other. The widths W of the first divided space (S1), the second divided space (S2), and the third divided space (S3) are equal to each other. The widths W of the fourth divided space (S4) and the fifth divided space (S5) are equal to each other. The width W of each of the first divided space (S1), the second divided space (S2), and the third divided space (S3) and the width W of each of the fourth divided space (S4) and the fifth divided space (S5) differ from each other. The depth lengths D of all of the divided spaces (S) are equal to each other.

Also in the modification, it is possible to obtain the same effect as that in the aforementioned embodiment.

Other Embodiments

The dividing wall portion (37) may have a configuration that partitions the internal space (36) into at least two or more.

The plurality of spaces (S) may have a configuration in which the shapes of only two spaces (S) differ from each other. In this case, at least one of the height H, the width W, and the depth length D differs between the two spaces (S).

The shape of each space (S) is not limited to a rectangular parallelepiped shape and may be a columnar shape, an oval shape, or the like. When the shape of each space (S) is not a rectangular parallelepiped as described above, the maximum height thereof is considered the height H in the present disclosure, the maximum width thereof is considered the width W in the present disclosure, and the maximum depth length thereof is considered the depth length D in the present disclosure.

When the shapes of the plurality of spaces (S) are set to be different from each other, these spaces (S) may have a similarity relation.

The height position of the bent pipe (70) may gradually change from the inflow port (the discharge flow path (38)) to the outflow port (73).

The compressor (10) may be a twin-screw compressor having two screw rotors. The compressor (10) may be a two-gate single screw compressor having one screw rotor and two gate rotors.

Other than the screw type, the compressor (10) may be of a rotary type, a swing type, a scroll type, a turbo type, or the like.

The refrigeration apparatus may be an air conditioning apparatus that performs indoor air conditioning, a cooler that cools inside air, a heat-pump water heater, or the like.

The oil separator (30) may be of another type other than the centrifugal separation type.

The present disclosure is useful for an oil separator.

The invention claimed is:

1. An oil separator comprising:
a cover attached to an opening portion on a discharge side of a compressor;
a discharge flow path formed in an inside of the cover, and
an oil separation portion having a cylindrical shape and configured to separate an oil from a fluid that has flowed out from the discharge flow path,
a dividing wall portion partitioning an internal space facing the opening portion into a plurality of spaces, the dividing wall portion being provided in the inside of the cover,
the internal space being a discharge space into which a high-pressure gas refrigerant discharged from the compressor flows, the internal space having a shape extending in a first direction,
each of the plurality of spaces facing a high-pressure chamber in the opening portion so as to be in direct communication with the high-pressure chamber,
the dividing wall portion including a first wall that extends in the first direction from a bottom surface defining the internal space to a top surface defining the internal space and partitions the internal space in a second direction, the second direction being orthogonal to the first direction and substantially parallel to a horizontal direction,
the first direction being substantially parallel to a vertical direction and extending in a direction substantially parallel to an axial centerline of the cylindrical shape of the oil separation portion,
the cover having a height in the first direction larger than a width of the cover in the second direction, and
the internal space having a height in the first direction larger than a width of the internal space in the second direction.

2. The oil separator according to claim 1, wherein the plurality of spaces includes at least two spaces that differ from each other in shape.

3. The oil separator according to claim 2, wherein the at least two spaces that differ from each other in shape differ from each other in height.

4. The oil separator according to claim 2, wherein the at least two spaces that differ from each other in shape differ from each other in width in the second direction.

5. The oil separator according to claim 2, wherein
the at least two spaces that differ from each other in shape differ from each other in depth length in a third direction orthogonal to both the first direction and the second direction.

6. The oil separator according to claim 2, wherein
all of the plurality of spaces are equal to each other in depth length in a third direction orthogonal to both the first direction and the second direction.

7. The oil separator according to claim 3, wherein
the at least two spaces that differ from each other in shape differ from each other in width in the second direction.

8. The oil separator according to claim 5, wherein
the at least two spaces that differ from each other in shape differ from each other in depth length in a third direction orthogonal to both the first direction and the second direction.

9. The oil separator according to claim 4, wherein
the at least two spaces that differ from each other in shape differ from each other in depth length in a third direction orthogonal to both the first direction and the second direction.

* * * * *